3,431,286
2-ISONITROSO-3-OXO STEROIDS
Raymond O. Clinton, East Greenbush, N.Y., assignor to Sterling Drug Inc., New York, N.Y., a corporation of Delaware
No Drawing. Filed Jan. 28, 1963, Ser. No. 254,479
U.S. Cl. 260—397.4       3 Claims
Int. Cl. C07c 169/22

This invention relates to new steroid compounds and in particular is concerned with 2-isonitroso-3-oxo steroids of the androstane series.

The compounds of the invention are of the following structural formula:

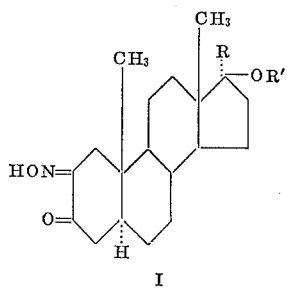

I wherein R is hydrogen or lower-alkyl and R' is hydrogen or lower-carboxylic acyl.

In the above Formula I, R, when lower-alkyl, can be an alkyl group having from one to about four carbon atoms, thus including methyl, ethyl, propyl, isopropyl, butyl and the like.

In the above Formula I, R', when lower-carboxylic aryl, can be derived from carboxylic acids having from one to about ten carbon atoms, conventionally employed in the steroid art, and having a molecular weight less than about 200. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like.

The compounds of Formula I are prepared by causing androstan-17β-ol-3-one, a 17α-lower-alkylandrostan-17β-ol-3-one, or lower-carboxylic acid esters thereof to react with a lower-alkyl nitrite in the presence of a strong base, such as an alkali metal alkoxide or amide, for example, potassium tertiary-butoxide. If the starting material is an ester the ester will be largely saponified during the work-up of the reaction, but the resulting 17-hydroxy compound (I, R' is H) can, if desired, be reesterified by conventional esterification reactions as by heating with the appropriate acid anhydride or acid halide in the presence of pyridine.

Endocrinological studies of the compounds of the invention have shown that they possess useful pituitary inhibiting properties.

The compounds of the invention can also be used as intermediates in the preparation of steroido[2,3-d]triazoles, having useful electrolyte modifying properties. Said preparation is carried out by preparing the 3-hydrazone derivative of a compound of Formula I and cyclizing the hydrazone by heating it in the presence of a lower-alkanoic acid anhydride and an alkali metal lower-alkanoate. The steroido[2,3-d]triazoles are disclosed and claimed in the copending application of R. G. Christiansen, Ser. No. 254,484 filed Jan. 28, 1963, which issued Oct. 18, 1966 as U.S. Patent No. 3,280,112 entitled, "Steroido[2,3-d]Triazoles."

The structures of the compounds of the invention were established by the mode of synthesis, by ultraviolet and infrared spectral analysis, and by the fact that the values found upon elementary analysis corresponded to the values calculated for the assigned structures.

The following examples will further illustrate the invention without the latter being limited thereby.

EXAMPLE 1

2-isonitroso-17α-methylandrostan-17β-ol-3-one
[I; R is CH₃, R' is H]

A solution of 6.09 g. of 17α-methylandrostan-17β-ol-3-one in 100 ml. of tetrahydrofuran was added to a solution of potassium tertiary-butoxide (prepared from 1.56 g. of potassium and 100 ml. of tertiary-butyl alcohol) at room temperature. A solution of 2.27 g. of n-butyl nitrite in 40 ml. of tertiary-butyl alcohol was then added over a period of fifteen minutes, and the mixture was stirred for five hours and allowed to stand overnight. The reaction mixture was poured into 2 liters of water and extracted with two 250 ml. portions of methylene dichloride and two 500 ml. portions of ether. The combined extracts were extracted with five 500 ml. portions of 1 N sodium hydroxide solution. The alkaline extracts were acidified, and the precipitated product was extracted with ether, and the extracts were washed with water and saturated sodium chloride solution, and dried over anhydrous sodium sulfate. The ether solution was concentrated, and the residue combined with the product from another run starting from 12.16 g. of 17α-methyl-androstan-17β-ol-3-one and placed on a column of 500 g. of silica gel as a suspension in ether-methylene dichloride-pentane 1:1:2. The column was eluted with the same solvent mixture and then with ether-methylene dichloride-pentane 2:1:1. The solid fractions were recrystallized from methanol to give 2-isonitroso-17α-methylandrostan-17β-ol-3-one in the form of colorless needles, M.P. 269.4–273.0° C. (corr.), $[\alpha]_D^{25} = +45.0°$ (1% in chloroform); ultraviolet maximum at 244 mμ (ε=7,300); infrared absorption at 2.94, 3.16, 5.85 and 6.23μ.

EXAMPLE 2

2-isonitrosoandrostan-17β-ol-3-one [I; R and R' are H] was prepared from 11.00 g. of androstan-17β-ol-3-one, 3.90 g. of n-butyl nitrite and potassium tertiary-butoxide (from 1.95 g. of potassium) according to the procedure described above in Example 1. The crude product was recrystallized directly from methanol without chromatographic purification to give 2-isonitrosoandrostan-17β-ol-3-one in the form of colorless needles, M.P. 283° C. (corr., dec.), $[\alpha]_D^{25} = +50.3°$ (1% in pyridine); ultraviolet maximum at 243 mμ (ε=6,950); infrared absorption at 2.91, 3.20, 3.45, 5.84 and 6.21μ.

2-isonitrosoandrostan-17β-ol-3-one can be caused to react with acetic anhydride, propionic anhydride, caproyl chloride, succinic anhydride, β-cyclopentylpropionyl chloride, benzoyl chloride, p-nitrobenzoyl chloride, 3,4,5-trimethoxybenzoyl chloride, phenylacetyl chloride or cinnamoyl chloride, by heating in the presence of pyridine, to give, respectively, 17β-acetoxy-2-isonitrosoandrostan-3-one, 17β-propionoxy-2-isonitrosoandrostan-3-one, 17β-caproyloxy-2-isonitrosoandrostan-3-one, 17β-(β-carboxypropionoxy) - 2 - isonitrosoandrostan-3-one, 17β-(β - cyclopentylpropionoxy)-2-isonitrosoandrostan-3-one, 17β-benzoyloxy - 2 - isonitrosoandrostan-3-one, 17β-(p-nitrobenzoyloxy)-2-isonitrosoandrostan-3-one, 17β-(3,4,5-trimethoxybenzoyloxy)-2-isonitrosoandrostan-3-one, 17β-phenylacetoxy-2-isonitrosoandrostan-3-one or 17β-cinnamoyloxy-2-isonitrosoandrostan-3-one. Some acylation of the isonitroso group may result, but these labile derivatives can readily be hydrolyzed by treatment with aqueous alkali under conditions which are too mild to have any effect on the 17-acyloxy group.

2-isonitrosoandrostan-17β-ol-3-one was heated with hydrazine hydrate in ethanol solution to give the 3-hydrazone, M.P. 178–190° C. (uncorr.). The latter was cyclized by heating it with fused sodium acetate in acetic anhydride to give 17β-acetoxyandrostano[2,3-d]triazole, M.P. 283–285° C. (corr.).

I claim:
1. A compound of the formula

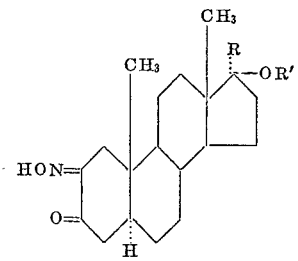

wherein R is a member of the group consisting of hydrogen and lower-alkyl, and R' is a member of the group consisting of hydrogen and lower-carboxylic acyl.
2. 2-isonitroso-17α-methylandrostan-17β-ol-3-one.
3. 2-isonitrosoandrostan-17β-ol-3-one.

No references cited.

HENRY A. FRENCH, *Primary Examiner.*

U.S. Cl. X.R.

260—239.5, 999